United States Patent
Droz

(10) Patent No.: US 8,448,872 B2
(45) Date of Patent: May 28, 2013

(54) CARD WITH DIGITAL DISPLAY

(75) Inventor: François Droz, Corcelles (CH)

(73) Assignee: NagraID S.A., La Chaux-de-Fonds (CH)

( * ) Notice: Subject to any disclaimer, the term of this patent is extended or adjusted under 35 U.S.C. 154(b) by 323 days.

(21) Appl. No.: 12/531,964

(22) PCT Filed: Mar. 4, 2008

(86) PCT No.: PCT/EP2008/052613
§ 371 (c)(1),
(2), (4) Date: Sep. 18, 2009

(87) PCT Pub. No.: WO2008/113677
PCT Pub. Date: Sep. 25, 2008

(65) Prior Publication Data
US 2010/0102132 A1    Apr. 29, 2010

(30) Foreign Application Priority Data
Mar. 19, 2007 (EP) .................... 07104420

(51) Int. Cl.
*G06K 19/06* (2006.01)
(52) U.S. Cl.
USPC ........................... 235/492; 235/488
(58) Field of Classification Search
USPC .............. 235/380, 382, 375, 486, 487, 493, 235/492, 488
See application file for complete search history.

(56) References Cited

U.S. PATENT DOCUMENTS

| | | | |
|---|---|---|---|
| 4,667,087 A | 5/1987 | Quintana |
| 4,876,441 A | 10/1989 | Hara et al. |
| 5,026,452 A | 6/1991 | Kodai |
| 5,399,847 A | 3/1995 | Droz |
| 6,176,430 B1 | 1/2001 | Finkelstein et al. |
| 6,402,039 B1 | 6/2002 | Freeman et al. |
| 7,518,692 B2 | 4/2009 | Yamazaki et al. |
| 2004/0129450 A1 | 7/2004 | Yamazaki et al. |

(Continued)

FOREIGN PATENT DOCUMENTS

| | | |
|---|---|---|
| EP | 0 570 784 | 5/1993 |
| EP | 1 437 683 | 7/2004 |
| EP | 1 439 410 A2 | 7/2004 |
| WO | WO2006046214 * | 5/2006 |

OTHER PUBLICATIONS

Search Report issued by the Australian Patent Office in the corresponding Singapore application SG 200905968-4, completed Nov. 20, 2009 and mailed Dec. 7, 2009.

(Continued)

*Primary Examiner* — Thien M Le
(74) *Attorney, Agent, or Firm* — Griffin & Szipl, P.C.

(57) ABSTRACT

The invention relates to a card (38) including a digital display (10) arranged in a node (4) defining the central portion of the card. It further comprises a plastic layer (40) the major portion (42) of which is opaque, and a transparent display portion (44). A pattern (14) is printed on the upper face of the plastic layer (40), in particular by an offset printing technique. The plastic layer (40) is covered with a transparent film (12) attached thereto by a thin glue layer (34) defining an adhesion interface. The electronic display (10) is fully integrated in the card (38) and the printed pattern (14) exhibits a good contrast on the opaque portion of said plastic layer. Furthermore, a good adhesion is obtained between all the layers of the card.

25 Claims, 2 Drawing Sheets

U.S. PATENT DOCUMENTS

| | | |
|---|---|---|
| 2004/0169086 A1 | 9/2004 | Ohta et al. |
| 2005/0045729 A1 | 3/2005 | Yamazaki |
| 2009/0224176 A1 | 9/2009 | Patel |
| 2010/0026943 A1* | 2/2010 | Jagt et al. ............... 349/115 |
| 2010/0085718 A1* | 4/2010 | Sakurai et al. ........... 361/761 |
| 2010/0102132 A1* | 4/2010 | Droz ........................ 235/492 |
| 2010/0295290 A1* | 11/2010 | Muth et al. ............... 283/109 |
| 2011/0180822 A1 | 7/2011 | Ruhnau et al. |

OTHER PUBLICATIONS

International Search Report issued in corresponding application No. PCT/EP2008/052613, completed May 26, 2008 and mailed Jun. 3, 2008.

Office Action on Nov. 26, 2012 in co-pending related U.S. Appl. No. 13/171,912.

* cited by examiner

CARD WITH DIGITAL DISPLAY

This is a National Phase Application in the United States of International Patent Application No. PCT/EP2008/052613 filed Mar. 4, 2008, which claims priority on European Patent Application No. 07104420.0, filed Mar. 19, 2007. The entire disclosures of the above patent applications are hereby incorporated by reference.

FIELD OF THE INVENTION

The present invention concerns a card incorporating an electronic display. This electronic display is generally associated with an electronic data processing circuit and, in some variants, with a switch or sensor enabling a user to activate a certain function. The electronic display can display variable codes and other data for increasing the security of bankcards or secure access cards, for example. Integrating an electronic display in a card causes a particular manufacturing constraint, given that the card has to be transparent above the display. The electronic display module is located inside the card according to the invention. Thus, the display module is covered by at least one additional outer protective layer.

BACKGROUND OF THE INVENTION

According to an advantageous method of manufacturing cards incorporating various electronic elements, the electronic elements are coated or embedded in a resin that forms a core or intermediate layer of the card. EP Patent No. 0 570 784 generally discloses a manufacturing method of this type. In order to obtain a core that has flat, uniform surfaces, it is preferable to coat all of the electronic elements incorporated in the card and thus to cover the electronic display with the resin coating. In this latter implementation made, the resin must be transparent at least in the display area. The transparency of the resin causes a problem as regards obtaining high quality printing, in particular on the top surface of the card where the display appears. Consequently, it raises a dual problem. Generally speaking, printing patterns on a transparent layer causes a decrease both in colour intensity and contrast, so that the colours have a translucent appearance. Secondly, the presence of various electronic elements in the transparent core causes variations in light reflected by the core, which results in darker areas on the surfaces of the core. The support on which a pattern is printed is thus not optically uniform, which generally leads to variations in contrast and variations in colour intensity on the top surface side of the finished card.

In order to overcome the aforementioned problem, in manufactured cards of the prior art, a light-coloured, preferably white, ink or varnish is deposited underneath the printed patterns relative to the core of the card, via a silkscreen printing technique, so that the thin layer of ink or varnish has a certain thickness. Two variants of cards made in accordance with this technique are shown in FIGS. 1 and 2.

Card 2 of FIG. 1 is formed of a core 4 incorporating an electronic unit 8 and an electronic display 10. These electronic elements 8 and 10 are embedded in a transparent resin 6 that forms core 4, which is made in a first step of a manufacturing method for such cards. Core 4 is formed by a technique known to those skilled in the art, in particular in a press or by injecting the resin into a mould. Next, a transparent film 12 is arranged on the top surface side of the core, on the inner surface of which a pattern 14 is printed. To obtain high quality printing, i.e. high definition, printed patterns 14 are preferably obtained by an offset printing technique. Then, according to this prior art method, a layer of ink or varnish 16 is printed on pattern 14. This layer 16 is preferably white and it extends over the entire bottom surface of transparent film 12 except for the display area located above electronic display 10. Layer 16 thus defines a window through which electronic display 10 is visible.

Likewise, a transparent film 18 is arranged on the bottom surface side of the card 2, on the top surface of which a pattern 20 is printed. This pattern 20 is covered by a layer of ink or varnish 22. Layer 22 is also preferably deposited by silkscreen printing. However, it should be noted that bottom layers 16 and 22 might be deposited by various techniques.

Card 22 according to the variant shown in FIG. 2 includes a core 24 formed of a resin or any material 26. Core 24 differs from core 4 of FIG. 1 in that the electronic display 10 at the top surface thereof is flush with the top surface of core 24. Unlike the preceding variant, material 26 does not have to be transparent here. Material 26 may be added in liquid form in a press or injection moulding installation, as for core 4 of FIG. 1. In another method of manufacturing core 24, electronic display 10 can be inserted in a shell with a preformed housing or in the aperture of a layer forming core 24, which may be formed of one or several layers assembled by lamination or by press bonding. In order to have a flat, uniform support for printing pattern 14, a transparent film 30 is arranged on the top surface of core 24. A layer of ink or varnish 16 is deposited on the top surface of film 30, leaving a window for electronic display 10. Pattern 14 is printed on this bottom layer 16 by an offset technique. A transparent external film 12 is then assembled to printed film 30. A fine layer of adhesive or resin is provided between printed film 30 and external film 12 to increase adherence between these two transparent films. On the bottom surface side of card 22, an opaque layer 32 is arranged against the core, on the bottom surface of which a pattern 20 is printed. This pattern 20 is then covered by a transparent external film 18 by means of a thin layer of adhesive or resin 36.

Besides problems linked to the thickness of card 22, when developing the present invention it was observed that embodiments of cards 2 and 22 did not efficiently resolve the previously identified problem, i.e. the problem of a decrease in contrast and low colour intensity due to the presence of a transparent layer or film behind the printed patterns 14. Two major problems appear with the embodiments described with reference to FIGS. 1 and 2.

First of all, the deposition of layer 16 by a printing technique does not provide a perfectly opaque background. Various experiments have demonstrated that it is necessary to deposit several layers particularly by silkscreen printing in order to obtain an opaque background providing a satisfactory visual appearance for high quality cards. Moreover, the inks or varnish that can produce this opaque background 16 are the type that have two components. Such inks or varnish have a relatively long drying time, which raises several manufacturing problems. Thus, the time necessary for printing or depositing several layers of varnish or ink for the opaque background is considerable. This raises a storage problem during the drying periods for each print or ink or varnish deposition. This results in a relatively expensive manufacturing method requiring a large storage capacity. This storage is not easy either since the printed films must not be touched during the drying periods.

The second major problem is the problem of adherence of the transparent external layer 12 in finished cards 2 and 22. The patterns 14 made by an offset printing technique adhere relatively poorly to the transparent plastic film 12. To increase the adherence of this external layer, printed pattern 14 is generally either covered with a thin layer of adhesive or resin that adheres well to the transparent plastic film used. If the two bottom layers 32 and 18 of card 22 are laminated to each other with a printed pattern 20 and fine layer of adhesive 36 between them, the adherence between layers 32 and 18 is sufficient. It was observed that this is due to the fact that adhesive 34 slightly penetrates the printed pattern and creates a multitude of anchorage points with the layer or film on which pattern 20 is printed. In other words, printed pattern 20 is sufficiently permeable to the adhesive for the latter for form a real adherence interface between the two plastic films or layers. The same effect is observed in the case of a similar card to that of FIG. 1 where only printed patterns 14 and 20 are provided. By selecting a resin 6 that adheres well to transparent layers 12 and 18, these layers have sufficient adherence to core 4 because resin 6 penetrates slightly printed patterns 14 and 20 during the card lamination assembly operation. Thus, it has been observed that the presence of the bottom layer forms a barrier to the adhesive or to the resin such that they can no longer ensure the proper adherence of layer 12 in cards 2 and 22, and respectively of layer 18 in card 2.

SUMMARY OF THE INVENTION

After highlighting the various aforementioned problems in the envisaged prior art solutions, shown in FIGS. 1 and 2, it is an object of the present invention to propose a solution for overcoming the aforementioned problems and to provide a card with an integrated electronic display therein, yet which has a very high quality printed pattern on the top surface thereof.

The present invention therefore concerns a card comprising an electronic display, arranged in a core of said card, and above said core a plastic layer, the greater part of which is formed of an opaque material and of a transparent material in a display part located above said electronic display. This transparent material defines a window for reading the electronic display.

In a main variant, the plastic layer forms a printing support or substrate for at least one printed pattern on the opaque part of the plastic layer. Preferably, the opaque material is white.

In a preferred variant, the plastic layer is formed of a sheet made of said opaque material, in which an aperture has been made in said display area. A transparent plate is arranged in said aperture. The thickness of the plate is preferably approximately equal to that of the opaque sheet.

BRIEF DESCRIPTION OF THE DRAWINGS

The present invention will be described in more detail in the following description, made with reference to the annexed drawings, given by way of non-limiting example, in which.

DETAILED DESCRIPTION OF THE INVENTION

Figure 1:
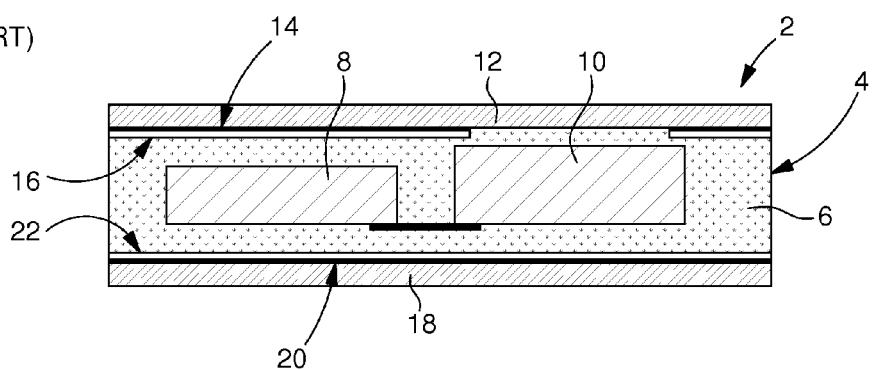
FIGS. 1 and 2 respectively show two transverse cross-sections of cards made in accordance with a method prior to the present invention.
Figure 3:
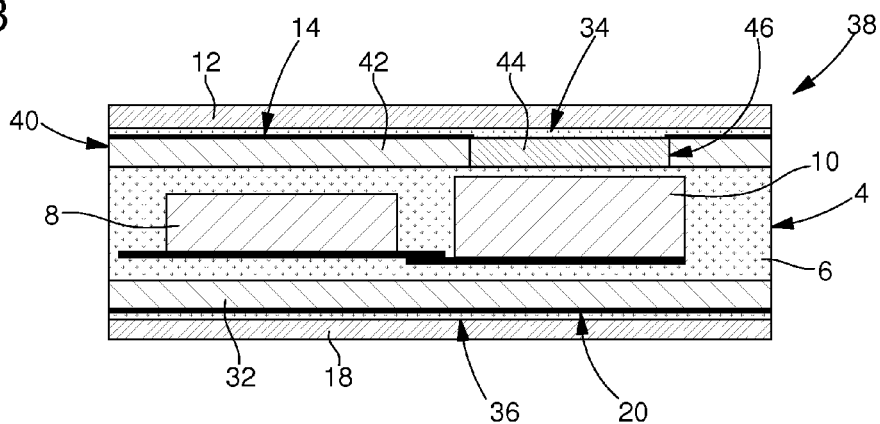
FIG. 3 is a transverse cross-section of a card according to the present invention.

FIG. 3 shows an embodiment of a card according to the invention. This card 38 has a core 4, similar to the core of card 2 of FIG. 1, in which an electronic unit 8 and electronic display 10 are embedded. Core 4 is formed by a transparent resin 6, which also covers electronic display 10. The electronic elements are thus coated or embedded in resin 6, which defines a compact core with two approximately flat surfaces. It will be noted that, in other variants of the cores, the electronic elements are merely covered by the resin without being entirely coated by said resin.

A layer 40, formed partly by an opaque material 42 and by a transparent material 44, is arranged on core 4, above electronic display 10 such that the display is visible from outside card 38. The greater part 42 of layer 40 is formed of opaque material, which is preferably white. Only one aperture 46, defined by opaque part 42 in the display area above electronic display 10, is filled by a transparent part 44. This aperture 46 defines a window whose dimensions are such that only the part used for the display of characters, numbers or other patterns of display unit 10 is visible. The thickness of transparent part 44 is approximately equal to that of opaque part 42. Thus, outside window 46, layer 40 defines a perfectly opaque light-coloured background for printing patterns 14 on the top surface of layer 40. Pattern 14 is preferably printed by an offset technique. A transparent external layer 12 is arranged on printed layer 40, using a thin layer of adhesive 34 ensuring that external layer 12 adheres properly to intermediate layer 40. As previously explained, given that it is only necessary to print a pattern, in particular in an offset printing installation, the thin layer of adhesive really defines an adherence interface between layers 40 and 12. The problems mentioned in relation to cards 2 and 22 of the prior art are thus solved by card 38 according to the invention.

In order to obtain a symmetrical card that also has a high quality print on the bottom surface of the card, an opaque layer 32 is added, on the bottom surface of which a pattern 20 is printed. Next, a transparent external layer 18, coated with a thin layer of adhesive 36 is added against printed sheet 32. The whole assembly is laminated in a press or using laminating rollers to ensure its assembly. Cards are thus obtained that have an integrated electronic display inside the card, visible through transparent layers or films, while outside the display area there is a print on a relatively thick opaque layer that allows very good contrast and good colour intensity. It will be noted that one could envisage having an electronic display on the bottom surface of the card or on the two sides of the card.

Figure 2:
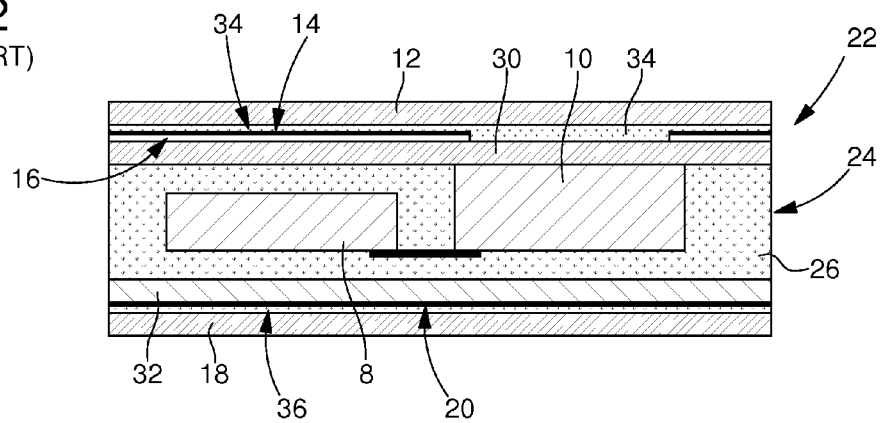
Figure 4:
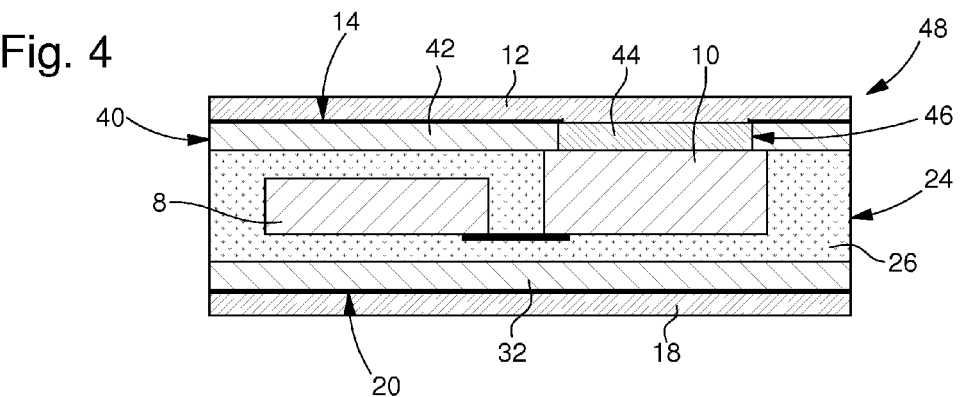
FIG. 4 shows an alternative embodiment of the card according to the invention.

Card 48 shown in cross-section in FIG. 4 is a variant made from a similar core 24 to that of card 22 shown in FIG. 2. On the top surface of core 24 there is a layer 40 of plastic material, the greater part 42 of which is formed of an opaque material. In the display area located above display unit 10, layer 40 has a part 44 formed of a transparent material. A printed pattern 14 is provided on opaque part 42. The printed layer 40 is covered with a transparent film 12. In this variant, there is no thin layer of adhesive between layer 40 and film 12. However, in another variant, a film acting as adherence interface may be arranged between layer 40 and external film 12. It will be noted that it is also possible to provide a thin layer of resin or adhesive between plastic layer 40 and core 24 to ensure that plastic part 40 adheres well to electronic display 10. This fine layer of adhesive is advantageously applied on the bottom surface of layer 40 before assembly to core 24. The thin adhesive layer may alternatively be deposited beforehand on the top surface of core 24 or be added in the form of a thin sheet arranged between layer 40 and core 24. These different alternatives and variants also apply to the arrangement of a fine layer of adhesive or resin between layer 40 and external layer 12.

Pattern 14 can be printed, in a variant, on the bottom surface of transparent film 12. This transparent film is then positioned such that printed pattern 14 is opposite opaque part 42.

On the side of the bottom surface of core 24 an opaque layer 32 and a transparent external film 18 are arranged, with a printed pattern 20 between them.

It will be noted that a transparent lacquer may replace transparent external films 12 and 18, for example, or any other transparent material that can protect printed patterns 14 and 20.

Figure 5:
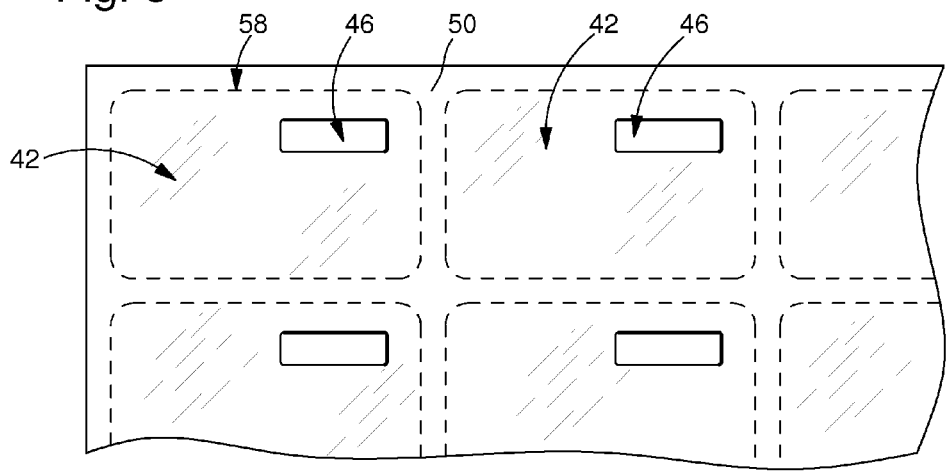
FIG. 5 shows a pierced opaque sheet involved in forming the card of FIGS. 3 and 4.

FIG. 5 shows a pierced plastic sheet 50 used to form layer 40 for a plurality of batch-manufactured cards. The contour 58 of the cards, obtained after cutting the finished cards from the batch, is represented by a dotted line. The sheet 50 has an aperture 46 for each card. The largest part 42 is formed by the opaque material of sheet 50, particularly PVC. Patterns 14 can be printed on this sheet either before making apertures 46, or after this operation. Printing beforehand provides a printed pattern that perfectly surrounds the aperture provided for each card.

Figure 6:
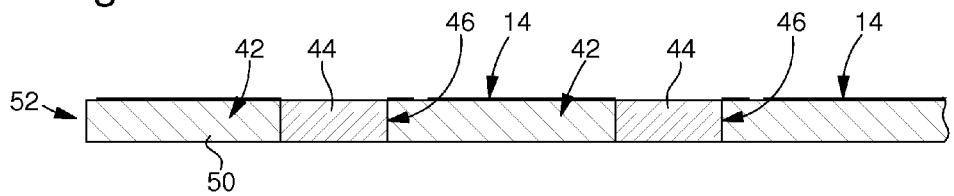
FIG. 6 shows schematically a first variant of a printed opaque sheet that has windows filled with a transparent material.

FIG. 6 shows an intermediate product 52 involved in a first implementation of a card manufacturing method according to the invention.

Intermediate product 52 is formed of sheet 50, shown in FIG. 5, which defines a plurality of opaque parts 42 for a corresponding plurality of cards. In apertures 46 of sheet 50 there are transparent parts 44, which have approximately the same thickness as parts 42, so as to form an intermediate product 52 that defines a flat structure. A plurality of patterns 14 is printed on the top surface of sheet 50. Transparent parts 44 are preferably formed by plates cut from a transparent sheet and inserted into apertures 46. Plates 44 can be obtained in other ways known to those skilled in the art.

Those skilled in the art can use various assembly techniques to ensure that plates 44 remain in place until the step for laminating them to the cores of the manufactured cards. For example, a few weld spots can be made using a simple heated tool tip, applied to the edge of apertures 46. The plastic material melts locally, which creates weld spots and thus assembles plates 44 to sheet 50. These weld spots are preferably made on the bottom surface of sheet 50, i.e. on the side opposite the printed surface. However, it is also possible to make these weld spots carefully on the side of the printed surface, in particular when printing is carried out subsequently. It is also possible to secure plates 44 using an adhesive. This bonding step to keep transparent plates 44 in place may be combined with the deposition of a thin layer of adhesive on the bottom surface and/or the top surface of intermediate product 52. Transparent plates 44 may also be assembled to pierced plate 50 in a laminating step. It will be noted that this lamination may also be provided in addition to the aforementioned spot assembly. Providing heat can thus at least partially weld the lateral faces of the plates to the wall of the corresponding apertures 46 and provide a flat, uniform layer. The layer may then be used in a method of forming cards at a relatively low temperature.

Intermediate product 52 is particularly advantageous for a method where patterns 14 are printed after the opaque sheet has been assembled to the transparent plates, as the printing can then also partially cover the transparent plates.

The transparent parts 44 may, in another way of making cards according to the invention, be obtained by injecting a transparent material through windows 46.

Figure 7:
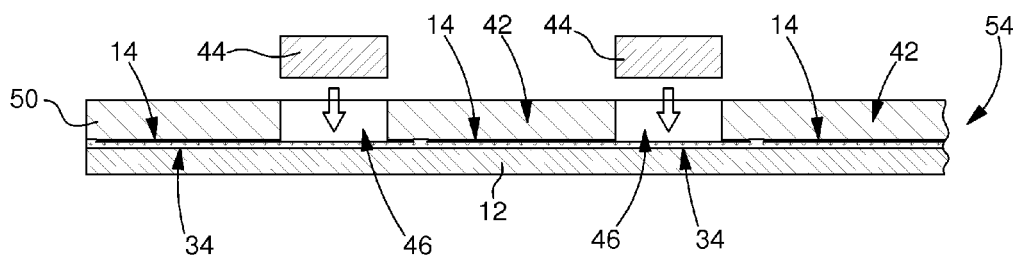
FIG. 7 shows how one part of the card shown in FIG. 3 is formed in accordance with a specific manufacturing method.

FIG. 7 shows a cross-section of another intermediate product 54 obtained within a second implementation of a card manufacturing method according to the invention. To obtain intermediate product 54, opaque sheet 50 is first printed to obtain a plurality of patterns 14. Then, a transparent film 12 covered with a layer of adhesive 34 is placed against sheet 50 on the side of printed patterns 14. Printed sheet 50 is then assembled to transparent film 12 and housings are obtained formed by apertures 46 that have adhesive layer 34 at the bottom thereof. Transparent plates 44 are then inserted into apertures 46 and secured to film 12 via the locally heated adhesive layer, for example. An intermediate product 54 is thus obtained which can then be assembled to a core 4 or 24 to provide cards according to the present invention. It will be noted that this intermediate product can also be obtained without the adhesive layer. In this latter case, the temporary assembly is achieved via a weld spot on one side or the other, on the edge of the apertures or at the centre, by welding the plates to transparent film 12. Preferably, the assembly thereby obtained is then laminated to obtain a properly flat, multi-layered structure, without slots and without any marks that could result from the temporary assembly of the transparent plates.

In a method where the core is not made in a prior step, but is formed simultaneously while the whole card is being formed, intermediate product 54 is then used as a top, multi-layered structure, arranged in the laminating installation (flat press or rollers) on a resin in a viscous liquid state used to form a central core incorporating the electronic elements. A bottom sheet or multi-layered structure is generally arranged underneath the resin that is added in the laminating installation. Pre-assembled layers 18 and 32, as shown in FIG. 3 or 4, may form this bottom multi-layered structure. The top and bottom multi-layered structures are generally laminated at a relatively high temperature, but the entire card is finally made at a low temperature or ambient temperature, to prevent damaging the electronic elements.

It will be noted finally that transparent part 44 of plastic layer 40 may have various optical functions, particularly polarising or filtering functions, and have undergone various treatments, particularly an anti-reflective treatment. In an advantageous variant, this transparent part defines a Fresnel lens, which gives a magnifying effect. These functions or optical treatments are used first and foremost for increasing the reading comfort of the electronic display. However, they may also be used to give a certain visual or aesthetic appearance.

The invention claimed is:

1. A card including an electronic display arranged in a core of said the card, wherein the card has a plastic layer above the core, wherein the plastic layer is formed of two parts, and wherein the two parts are
   (a) an opaque greater part that is a preformed opaque plastic sheet with an aperture; and
   (b) a transparent display part located above the electronic display and, made of a transparent material, wherein the transparent display part is arranged in the aperture of the opaque plastic sheet.

2. The card according to claim 1, comprising a transparent external film arranged on the plastic layer, wherein a pattern is printed on the opaque greater part of the plastic layer, on the side of the transparent external film or on the interior surface of the transparent external film, so that the printed pattern is located opposite the opaque greater part.

3. The card according to claim 2, wherein a layer of resin or adhesive is arranged between the electronic display and the transparent display part of the plastic layer.

4. The card according to claim 2, wherein an adhesive layer is provided between the plastic layer and the transparent external film.

5. The card according to claim 1, wherein the thickness of the plastic layer is approximately constant.

6. The card according to claim 1, wherein the plastic layer is covered by a transparent external film.

7. The card according to claim 1, wherein a layer of resin or adhesive is arranged between the electronic display and the transparent display part of the plastic layer.

8. The card according to claim 1, wherein the transparent display part has a magnifying effect.

9. The card according to claim 8, wherein the display part defines a Fresnel lens.

10. The card according to claim 1, wherein the opaque plastic sheet is covered by a transparent external film.

11. The card according to claim 10, wherein the display part of the plastic layer is formed by a transparent plate arranged in the aperture of the opaque plastic sheet.

12. The card according to claim 11, wherein an adhesive layer is provided between the opaque plastic sheet with the transparent plate and the transparent external film.

13. The card according to claim 10, wherein the transparent material forming the display part of the plastic layer is injected into the aperture of the opaque plastic sheet.

14. The card according to claim 1, wherein a layer of resin or adhesive is arranged between the electronic display and the transparent display part of the opaque plastic sheet.

15. The card according to claim 1, wherein the plastic layer is directly arranged on the top surface of said core.

16. The card according to claim 15, where the core is formed by a resin, and wherein an electronic unit and the electronic display are embedded in the resin.

17. The card according to claim 16, wherein the resin is transparent and covers the electronic display.

18. The card according to claim 15, wherein the electronic display at the top surface thereof is flush with the top surface of said core.

19. The card according to claim 1, wherein the plastic layer and the core are assembled by means of a thin adhesive layer.

20. The card according to claim 19, where the core is formed by a resin, and wherein an electronic unit and the electronic display are embedded in the resin.

21. The card according to claim 20, wherein the resin is transparent and covers the electronic display.

22. The card according to claim 19, wherein the electronic display at the top surface thereof is flush with the top surface of said core.

23. The card according to claim 1, wherein the display part of the plastic layer is formed by a transparent plate arranged in the aperture of the opaque plastic sheet.

24. The card according to claim 1, wherein the display part of the plastic layer is formed by a transparent plate arranged in the aperture of the opaque plastic sheet.

25. The card according to claim 1, wherein the transparent material forming the display part of the plastic layer is injected into the aperture of the opaque plastic sheet.

* * * * *